US008880328B2

(12) United States Patent
Ovens et al.

(10) Patent No.: US 8,880,328 B2

(45) Date of Patent: Nov. 4, 2014

(54) METHOD OF OPTICALLY LOCATING AN AIRCRAFT RELATIVE TO AN AIRPORT

(71) Applicant: GE Aviation Systems LLC, Grand Rapids, MI (US)

(72) Inventors: Norman Leonard Ovens, Ada, MI (US); Michael Eric Figard, Rockford, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 39 days.

(21) Appl. No.: 13/667,444

(22) Filed: Nov. 2, 2012

(65) Prior Publication Data

US 2014/0129125 A1 May 8, 2014

(51) Int. Cl.
*G06F 19/00* (2011.01)

(52) U.S. Cl.
USPC ............ 701/300; 701/208; 701/210; 348/958

(58) Field of Classification Search
USPC ........................... 701/300, 208, 210; 348/958
See application file for complete search history.

(56) References Cited

U.S. PATENT DOCUMENTS

| | | | | |
|---|---|---|---|---|
| 6,405,975 | B1 | 6/2002 | Sankrithi et al. | |
| 6,480,799 | B2 * | 11/2002 | Hunter | 702/117 |
| 7,113,202 | B2 * | 9/2006 | Konya | 348/117 |
| 7,592,929 | B2 | 9/2009 | Pepitone | |
| 7,817,065 | B2 * | 10/2010 | Fetzmann et al. | 340/972 |
| 7,890,248 | B2 | 2/2011 | Poe et al. | |
| 7,908,078 | B2 | 3/2011 | He | |
| 7,999,699 | B2 * | 8/2011 | Caillaud et al. | 340/958 |
| 8,022,978 | B2 * | 9/2011 | Konya | 348/113 |
| 8,635,009 | B2 * | 1/2014 | LaFon et al. | 701/120 |
| 2003/0025614 | A1 | 2/2003 | Kahn | |
| 2003/0225487 | A1 | 12/2003 | Robert et al. | |
| 2004/0056952 | A1 | 3/2004 | Konya | |
| 2011/0257873 | A1 * | 10/2011 | Lussiez et al. | 701/120 |

FOREIGN PATENT DOCUMENTS

| | | | |
|---|---|---|---|
| EP | 2068293 | A2 | 6/2009 |
| WO | 2010072996 | A1 | 7/2010 |

OTHER PUBLICATIONS

Doehler et al., Autonomous Infrared-Based Guidance System for Approach and Landing, Enhanced and Synthetic Vision 2004.*
European Search Report for Counterpart EP13191308.9, dated Jun. 25, 2014.

* cited by examiner

*Primary Examiner* — Mary Cheung
*Assistant Examiner* — Michael Berns
(74) *Attorney, Agent, or Firm* — McGarry Bair PC

(57) ABSTRACT

A method of optically locating an aircraft relative to an airport having standardized signage, including markings, the method includes generating an image of at least a portion of the airport from an optical sensor mounted on the aircraft, determining the location of the aircraft, and providing an indication of the determined location within the aircraft.

19 Claims, 5 Drawing Sheets

METHOD OF OPTICALLY LOCATING AN AIRCRAFT RELATIVE TO AN AIRPORT

BACKGROUND OF THE INVENTION

For safe flight it is useful to know the location of the aircraft relative to the airport, both in the air an on the ground. In the air, the relative position of the aircraft relative to airport aids in landing the aircraft. On the ground, knowing the position of the aircraft relative to the airport runways, taxiways, etc., aids in ensuring the aircraft is in the desired position, and to avoid incidences such as runway incursions.

Aviation governing bodies have expended a large amount of resources to develop systems to aid in knowing the location of the aircraft relative to the airport and its runways, especially runway incursions as airports have gotten busier. However, the current systems require complicated radar systems, global positioning systems (GPS), detailed airport databases, and communication methodologies. Many of these systems are dependent on resources external to the aircraft and communication with the aircraft, making them subject to loss of utility if the communication is lost. Further, many of the GPS based systems require expensive receivers installed on the aircraft and the purchase and maintenance of aircraft physical survey databases describing runway position. Further, such systems will not provide any helpful information at an airport unless that airport is in the airport survey database.

BRIEF DESCRIPTION OF THE INVENTION

In one embodiment, the invention relates to a method of optically locating an aircraft relative to an airport having standardized signage, including markings, the method comprising, generating an image of at least a portion of the airport from an optical sensor mounted on the aircraft, identifying at least some of the standardized signage in the generated image by processing the generated image on a computer aboard the aircraft, determining the location of the aircraft relative to the airport based on the identified standardized signage, and providing an indication of the determined location within the aircraft.

DESCRIPTION OF EMBODIMENTS OF THE INVENTION

Figure 1:
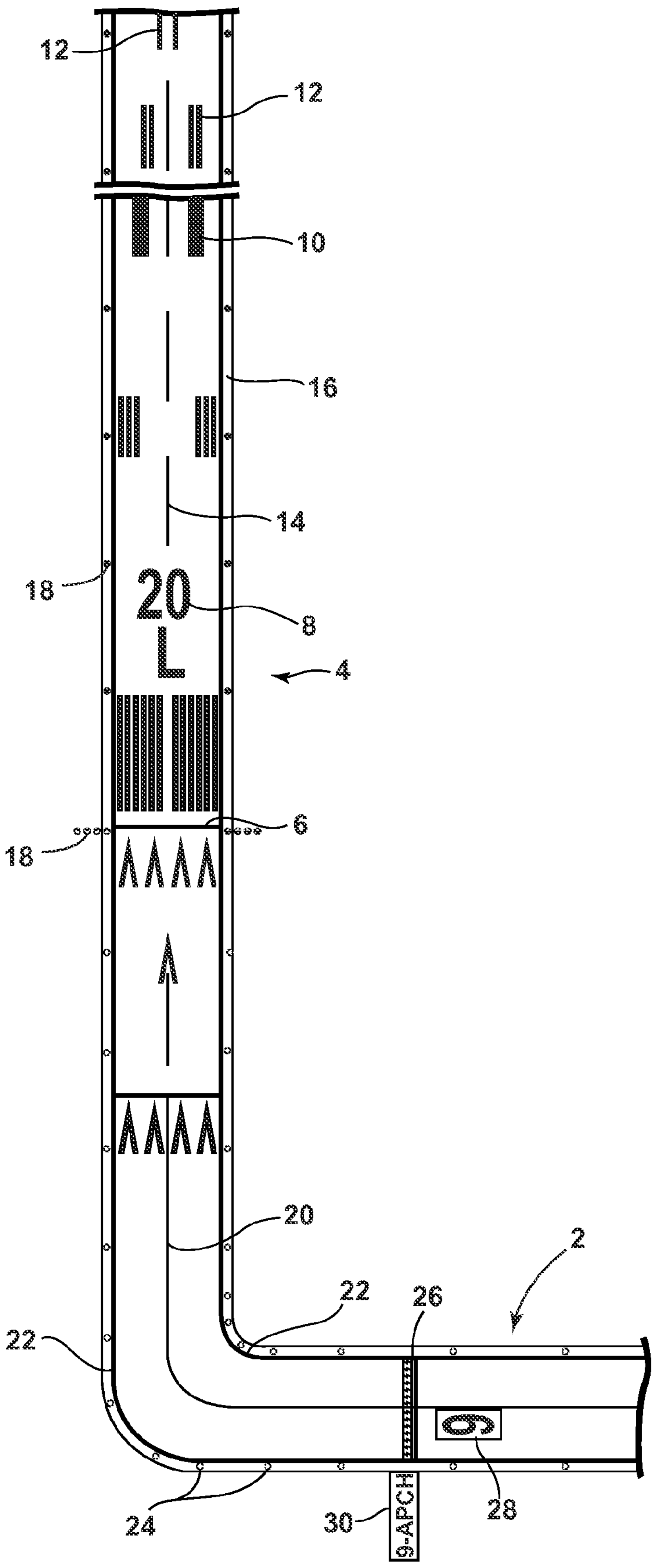
FIG. 1 is a schematic illustration of exemplary airport signage.
Figure 2:
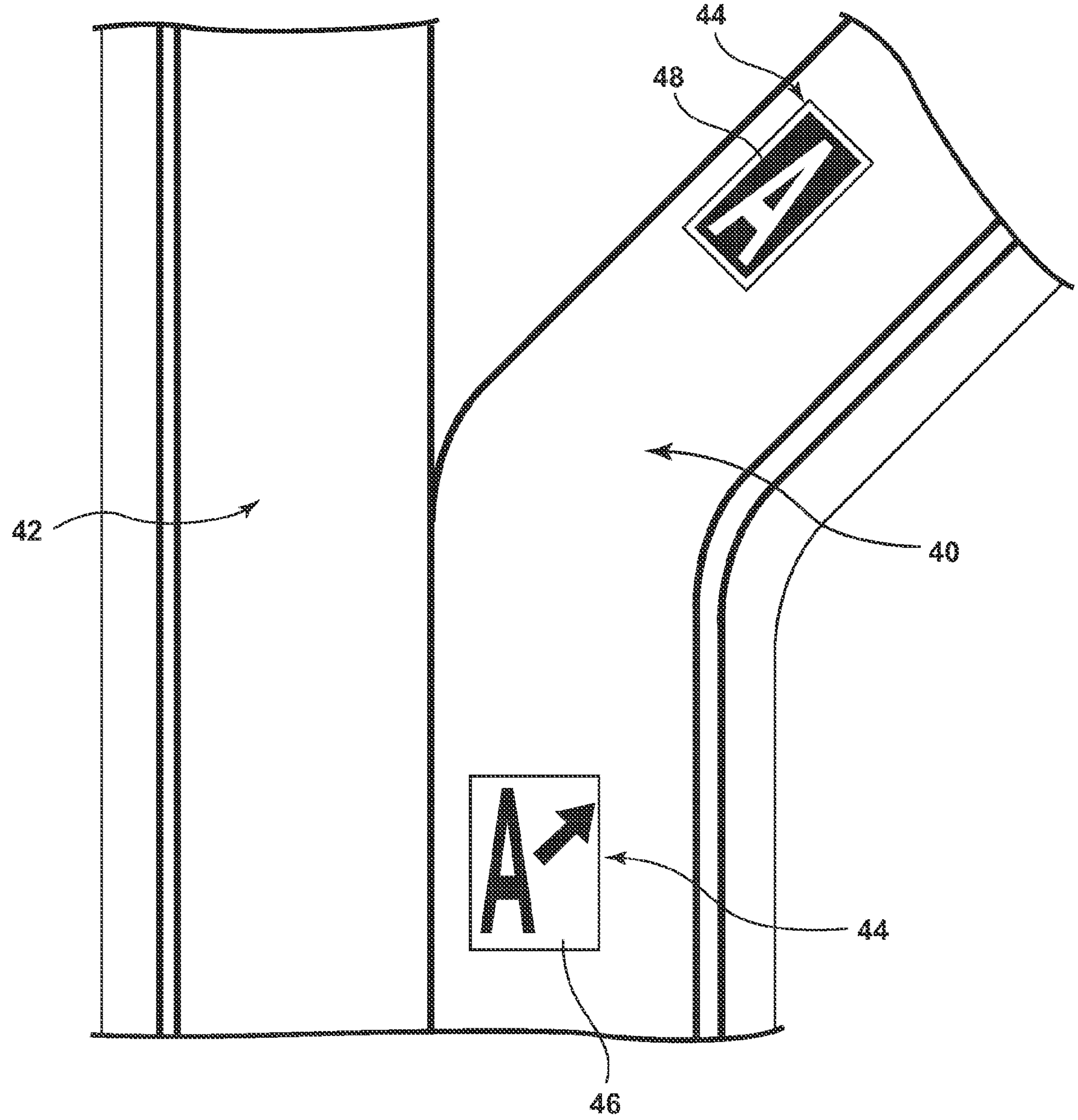
FIG. 2 is a schematic illustration of additional exemplary airport signage.

An initial explanation of an airport environment having standardized signage will be useful in understanding the inventive concepts. Airport signage, including signs, markings and lighting, are standardized by the International Civil Aviation Organization. FIGS. 1 and 2 illustrate a variety of airport standardized signage; additional information regarding standardized signage may be found at http://www.faa.gov. Beginning with FIG. 1, a taxiway 2 aligned with a runway 4 is illustrated as well as runway threshold markings 6, runway designation markings 8, runway aiming point markings 10, runway touchdown zone markings 12, runway centerline markings 14, runway side stripe markings 16, runway lighting 18, taxiway markings including taxiway centerline 20, taxiway edge marking 22, taxiway lighting 24, holding position markings 26, holding position sign 28, and holding position sign 30. FIG. 2 illustrates taxiway 40 and taxiway 42 with geographic position markings 44 including a direction sign 46 and a location sign 48. It will be understood that FIGS. 1 and 2 merely illustrate a portion of the standard signage at an airport.

Figure 3:
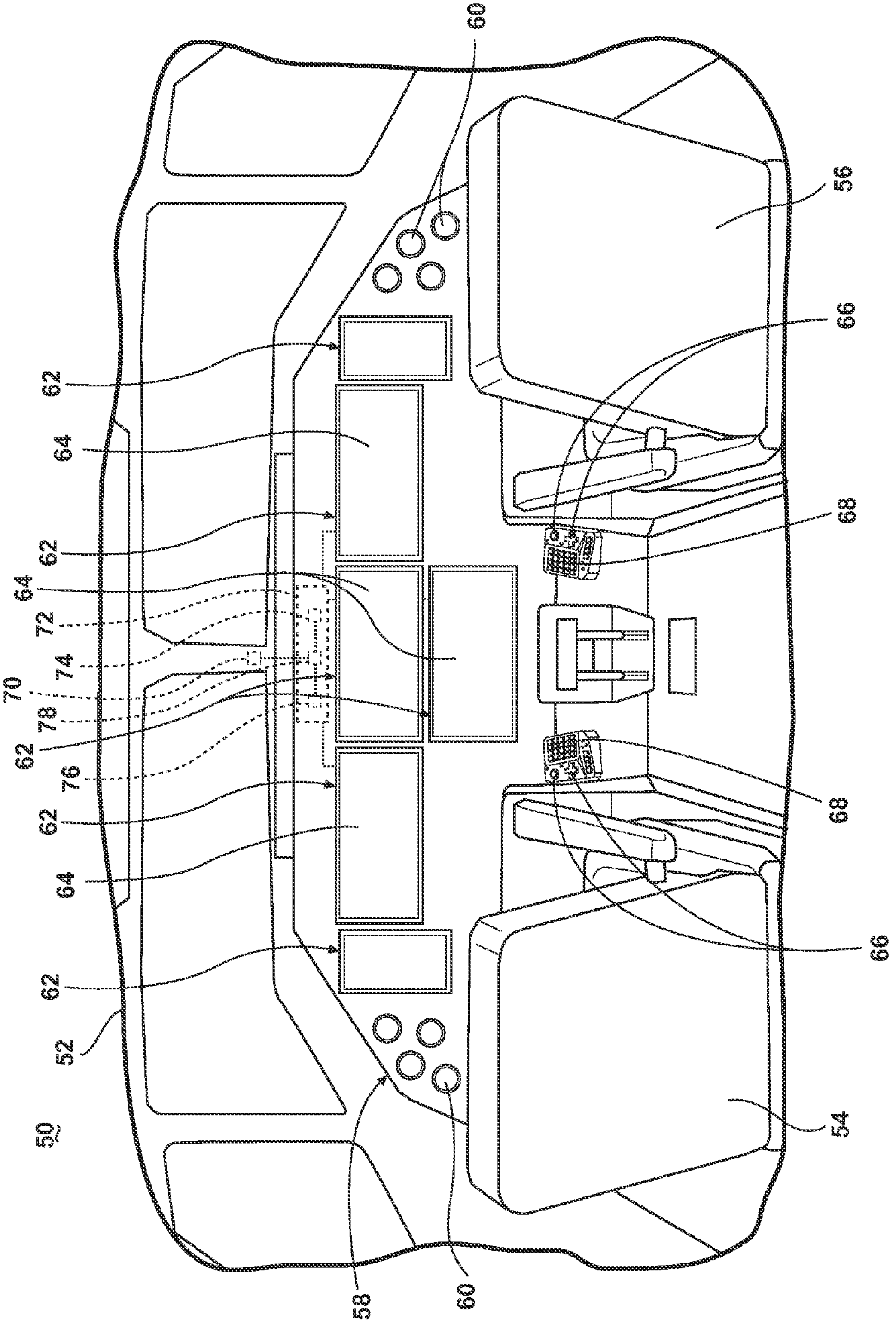
FIG. 3 is a perspective view of a portion of an aircraft that may be capable of optically locating itself.

FIG. 3 illustrates a portion of an aircraft 50 having a cockpit 52 where a first user (e.g., a pilot) may be present in a seat 54 at the left side of the cockpit 52 and another user (e.g., a co-pilot) may be present at the right side of the cockpit 52 in a seat 56. A flight deck 58 having various instruments 60 and multiple multifunction flight displays 62 may be located in front of the pilot and co-pilot and may provide the flight crew with information to aid in flying the aircraft 50. The flight displays 62 may include either primary flight displays or multi-function displays and may display a wide range of aircraft, flight, navigation, and other information used in the operation and control of the aircraft 50 including that the flight displays 62 may be electronic flight bag displays. The flight displays 62 may be capable of displaying color graphics and text to a user. The flight displays 62 may be laid out in any manner including having fewer or more displays and need not be coplanar or the same size. A touch screen display or touch screen surface 64 may be included in the flight display 62 and may be used by one or more flight crew members, including the pilot and co-pilot, to interact with the systems of the aircraft 50. It is contemplated that one or more cursor control devices 66 and one or more multifunction keyboards 68 may be included in the cockpit 52 and may also be used by one or more flight crew members to interact with the systems of the aircraft 50.

An optical sensor 70 may be mounted to the aircraft 50 and has been schematically illustrated as being located at a forward portion of the aircraft 50. It will be understood that the optical sensor 70 may be mounted anywhere on the aircraft 50, internal or external, and is preferably forward looking so that it may generate images of the environment located in front of the aircraft 50. By way of non-limiting example the optical sensor 70 may include a camera, which may be mounted on a forward portion of the aircraft 50 in a fixed location. Exemplary cameras include a CCD camera, a CMOS camera, a digital camera, a video camera, an infrared camera, or any other type of suitable camera for observing the external environment of the aircraft 50. In this manner, the optical sensor 70 may be capable of generating an image including at least one of a still image or a video image and outputting an image signal for same. The generated image may be in any suitable spectrum for the anticipated signage, including at least one of an infrared spectrum, visible light spectrum, and ultraviolet spectrum. It should be appreciated that the use of a camera is exemplary only and that other types of optical sensors 70 may be employed. Regardless of the type of optical sensor 70 used, it is contemplated that the optical sensor 70 may detect standardized signage, including markings such as markings painted on a runway in the environment in front of the aircraft 50. It is contemplated that the optical sensor 70 may provide any suitable type of image signal including images, video, etc. of at least a portion of environment in front of the aircraft 50.

A computer or controller 72 may be operably coupled to components of the aircraft 50 including the flight displays 62, touch screen surface 64, cursor control devices 66, multifunction keyboards 68, and optical sensor 70. The controller 72 may also be connected with other controllers (not shown) of the aircraft 50. The controller 72 may include memory 74 and a processor 76, which may be running any suitable programs. The memory 74 may include random access memory (RAM), read-only memory (ROM), flash memory, or one or more different types of portable electronic memory, such as discs, DVDs, CD-ROMs, etc., or any suitable combination of these types of memory. The controller 72 may also be connected with other controllers of the aircraft 50 over the aircrafts communication network. A computer searchable database of information may be stored in the memory 74 and accessible by the processor 76 or the controller 72 may be operably coupled to a database of information. For example, such a database may be stored on the same or alternative computer as the controller. It will be understood that the database may be any suitable database, including a single database having multiple sets of data, multiple discrete databases linked together, or even a simple table of data. For example, the database may include information related to standardized airport signage including standardized signs, standardized markings, and standardized lights. The controller 72 may also receive information from various sources including external memory, communication links such as a wireless communication link, and additional controllers or processors.

An image processing system 78 may utilize the database of standardized signage and an image processor. The image processing system 78 may be included in the aircraft 50 and may be operably coupled to the optical sensor 70 to receive the image signal and perform analysis on it. While the image processing system 78 is depicted as being a component of the controller 72, it is contemplated that the image processing system 78 could be a physically separate entity from controller 72. In the illustrated example, the controller 72 having the image processing system 78 may analyze the images signal from the optical sensor 70 without the utilization of a separate image processor. The image processing system 78 may be any suitable processing platform. Including that the image processing system 78 may be any combination of hardware and software that receives the image signal and processes or analyzes the image. For example, the image processing system 78 may include a software application that receives the image signal and processes it using object detection or recognition algorithms to detect and identify components of the environment in front of the aircraft 50.

By way of alternative example, the object recognition algorithm may be implemented in a set of computer executable instructions stored in the memory 74 of the controller 72 and a separate image processor component may not be required. For example, Optical Character Recognition (OCR) including application-oriented OCR or customized OCR software may be used to identify the standard signage. Additionally, object recognition such as computer vision-based object recognition may be used to recognize objects within the generated image.

During operation of the aircraft 50, the controller 72 may receive data from the optical sensor 70 from which the controller 72 and the image processing system 78 may determine information regarding the environment in front of the aircraft 50. By way of non-limiting example, the aircraft's location may be determined from the recognized signage in the image generated by the optical sensor 70. The controller 72 may access the memory 74 and the image processing system 78 may match the signage in the image with proper imagery data that may be stored in the memory 74. In this manner, the controller 72 may determine the location of the aircraft 50 and may provide indications including alerts regarding the same to the flight crew. For example, if a runway designation is identified, the controller 72 may determine the location of the aircraft 50 and may compare its location to where it should be and indicate any discrepancies in its location. The location where the aircraft should be may be thought of as a predetermined location such as a predetermined location entered by a pilot into a FMS. Many graphical and illustrative techniques may be used to indicate the location of the aircraft 50 and such indications may appear on the flight displays 62 as well as other suitable indicators that may be located within the cockpit 52. The controller 72 may also audibly alert the user using any suitable mechanism located in the cockpit 52.

Figure 4:
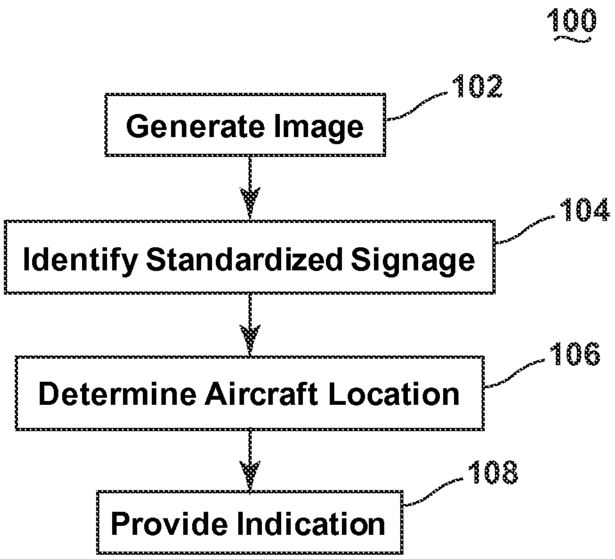
FIG. 4 is a flow chart of an exemplary method of optically locating an aircraft.

In this manner it will be understood that any suitably equipped aircraft may optically locate itself relative to an airport having standardized signage and may alert the crew to their position in relation to a runway both in the air and on the ground and to identify hazards within the runway environment. In accordance with an embodiment of the invention, FIG. 4 illustrates a method 100 of optically locating an aircraft relative to an airport having standardized signage. The sequence of steps depicted is for illustrative purposes only, and is not meant to limit the method 100 in any way as it is understood that the steps may proceed in a different logical order or additional or intervening steps may be included without detracting from embodiments of the invention. It is contemplated that such method 100 may be carried out by an aircraft while the aircraft is in the air or on the ground.

The method 100 may begin with generating an image of at least a portion of the airport at 102. This may be done using any suitable optical sensor including a camera mounted on the aircraft. At 104, at least some of the standardized signage in the generated image may be identified. This may be accomplished by processing the generated image on a computer aboard the aircraft. Identifying at least some of the standardized signage in the generated image may include identifying at least one of runway threshold markings, runway designation markings, runway aiming point marking, runway touchdown zone marking, runway centerline marking, runway side stripe marking, runway shoulder marking, runway threshold marking, taxiway markings, geographic position markings, holding position markings, runway lighting, and taxiway lighting.

At 106, the location of the aircraft relative to the airport may be determined based on the identified standardized signage. For example, the computer onboard the aircraft may use information regarding standard airport signage, markings and lighting to determine the position of the aircraft relative to the airport or using the standardized signage identified in the generated image. By way of non-limiting example, a detected runway identifier may be compared with data regarding the designated runway to be used. Determining the location of the aircraft may include determining the distance from the aircraft to the identified standardized signage. A situational position of the aircraft may also be determined based on the identified standardized signage. This may include determining a relative transitioning of the aircraft between a taxiway and a runway.

It is contemplated that multiple images may be generated and that the location of the aircraft may be determined based on the signage identified in the multiple images. It is further contemplated that more than one sensor may be used such that multiple images may be generated by the sensors and that the location of the aircraft may be determined based on the signage identified in the multiple images. The multiple images may better allow for depth to be determined aiding in the determination of the location of the aircraft.

At 108, an indication of the determined location may be provided within the aircraft. More specifically, the indication or alert may be provided to the flight crew within a cockpit of the aircraft. At least one of an audible and visual indication may be provided. This may include providing a visual display on a flight deck located within the cockpit. A variety of suitable indications may be provided based on the determined location of the aircraft. For example, indications may include that the aircraft is approaching a runway on the ground or crossing a runway on the ground. Further, a visual or aural indication of the runway from which the aircraft is attempting to take-off may be given. An indication may be given if take-off is being attempted on a runway other than that designated for take-off or if the aircraft is approaching the end of the runway while on the ground. Further still, a visual or aural indication may identify the runway to which the aircraft is attempting to land or is approaching a runway while in the air.

Figure 5:
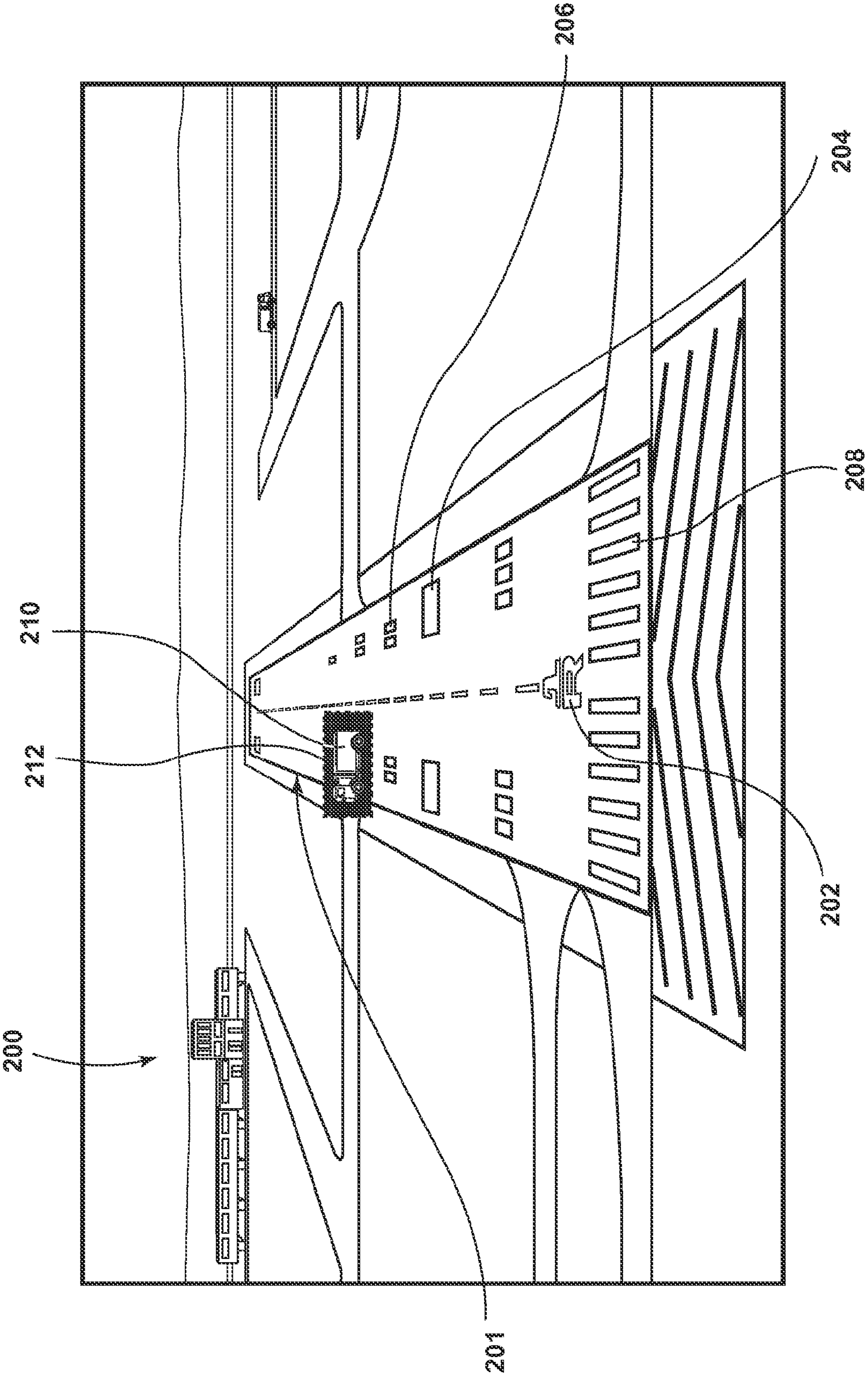
FIG. 5 is a perspective view of an exemplary image that may be generated during optically locating an aircraft.

By way of non-limiting example, the method of optically locating the aircraft may include generating an image of a runway of the airport. For example, FIG. 5 illustrates an image of a portion of an airport 200 including a runway 201 that may be taken by an aircraft during landing. The above described embodiments may identify at least some of the standardized signage including runway designation markings 202, runway aiming point markings 204, runway touchdown zone markings 206, and runway threshold markings 208. It is contemplated that a distance the aircraft is from the runway 201 may be determined from the identified signage. More specifically, the perspective of the signage in the generated image may be used to determine the distance the aircraft is from the runway 201. An indication of the distance the aircraft is from the runway 201 may then be provided within a cockpit of the aircraft. By way of additional non-limiting example, it is also contemplated that one or more hazards 210 may be identified in the generated image and that an alert of the identified hazard may be provided. For example, it is contemplated that indications may be given with respect to detected hazards on the runway such as aircraft, vehicles, or animals. In the illustrated example, a hazard 210 in the form of a truck is located on the runway 201 and an alert may be provided to the flight crew regarding same. For example, if the image is displayed to the flight crew, then the hazard 210 may be indicated with highlighting on the screen such as indicated at 212.

Previously, there have been accidents where aircraft have taken off or landed on runways other than the one assigned or taken off or landed on taxiways which are not intended for take-off or landing. The current mitigation method is for the flight crew to verbally state the runway they are aligned with before take-off. The above inventive embodiments may automate this process and ensures this check is not missed. For example, the above method may be used to detect the runway identifier painted on the runway or displayed on airport signage and aurally read it to the flight crew. The detected runway identifier may be compared to a designated departure runway and it may be determined if the aircraft is aligned with the runway of intended departure. If the runway alignment does not match the selected runway, an additional alert may be provided. The indication may also include that the landing is being attempted on a runway other than the runway designated for landing or that take-off or entry to a runway is being attempted in contradiction to runway status lights indications or equivalent indications.

Furthermore, the physical airport signage and markings could be supplemented with infrared or ultraviolet mechanisms to convey additional information to assist in detection and identification. More specifically, the infrared or ultraviolet mechanisms could be recognized if the optical sensor technology used can discern the infrared and ultraviolet objects. It is contemplated that such mechanisms may not be human readable letters or numbers and may include shapes or digital encoding. Furthermore, these mechanisms may not be the current standard symbology in the standardized signage and may instead by symbology developed for locating the aircraft. The optical sensor image can also be supplemented with additional identifying features to highlight the detected runway components to the flight crew if the image is displayed to the flight crew. Further still, the indications provided to the flight crew may highlight or display the centerline of the runway during low visibility take-offs and landing. External systems may use the centerline identification to further augment ground steering methodologies used by those systems.

The above described embodiments provide a variety of benefits including that the proposed system is self-contained, may be used at any airport, and may be used with or without the existing advisory methodologies and provides an added safety layer to the existing layers of prevention measures. A technical effect is that the location of the aircraft may be determined from recognized signage and indications including alerts may be provided to the flight crew in an effort to prevent unapproved runway incursions and to ensure departure from the correct runway. The above described embodiments function on the ground and in the air and would not require prior knowledge of the airport topology, construction, or structure and does not require radar, positioning systems, or detailed airport map databases that require continual update.

While a commercial aircraft has been illustrated it is contemplated that embodiments of the invention may be used in any type of aircraft, for example, without limitation, fixed-wing, rotary-wing, rocket, personal aircraft, and military aircraft. It will be understood that the technology used in the general aviation aircraft may be the equivalent of a webcam and tablet computer with suitable software and in larger business and transport aircraft the technology used may include existing computer platforms, enhanced vision cameras, and integration with the Flight Management System for runway selection. It is also contemplated that the indication may be provided by the tablet computer.

Furthermore, it is contemplated that embodiments of the invention may be used with an aircraft in the form of an unmanned aerial vehicle (UAV). In such an instance, an image may be generated from an optical sensor mounted on the UAV. The identification of at least some of the standardized signage may be done either onboard the UAV or at a ground station. If the processing is done at the ground station, such as for example a computer at the ground stations, it is contemplated that the UAV and the ground station may have any suitable communication abilities so that the image signal may be provided to the ground station. Further, the providing the indication of the determined location may include providing an indication to a user on the ground.

Further, it will be understood that the inventive embodiments may be capable of identifying any suitable additional signage. For example, while not illustrated or described runway guard lights and stop bar lights may also be included and utilized by the inventive embodiments. The runway guard lights help highlight the runway hold point and the stop bar lights are controlled by the control tower at some airports and are turned off when it is okay to cross or enter a runway.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of optically locating an aircraft relative to an airport runway having standardized signage, including markings, the method comprising:
- generating an image of at least a portion of the airport during takeoff or landing, from an optical sensor mounted on the aircraft;
- identifying at least some of the standardized signage in the generated image by processing the generated image;
- determining the location of the aircraft relative to the airport based on the identified standardized signage; and
- providing an indication of the determined location.

2. The method of claim 1 wherein:
- the generating the image of at least a portion of the airport comprises generating an image of a runway of the airport;
- the identifying the at least some of the standardized signage comprises identifying runway designation markings;
- the determining the location comprises determining a distance the aircraft is from the runway; and
- the providing the indication of the determined location comprises providing an indication within a cockpit of the aircraft of the distance the aircraft is from the runway.

3. The method of claim 1 wherein generating the image comprises generating at least one of a still image or a video image.

4. The method of claim 1 wherein generating the image comprises generating an image of at least one of an infrared spectrum, visible light spectrum, and ultraviolet spectrum.

5. The method of claim 1 wherein the generated image is processed on a computer aboard the aircraft.

6. The method of claim 5 wherein processing the generated image on a computer aboard the aircraft comprises applying an object recognition algorithm to the generated image.

7. The method of claim 6 wherein the object recognition algorithm is implemented in a set of computer executable instructions stored in a memory of the computer aboard the aircraft.

8. The method of claim 1 wherein identifying the at least some of the standardized signage in the generated image comprises identifying at least one of runway threshold markings, runway designation markings, runway aiming point markings, runway touchdown zone markings, runway centerline markings, runway side stripe markings, runway shoulder markings, taxiway markings, geographic position markings, and holding position markings.

9. The method of claim 1 wherein determining the location comprises determining a distance from the aircraft to the identified standardized signage.

10. The method of claim 1 wherein determining the location comprises determination of a situational position of the aircraft.

11. The method of claim 1 wherein providing the indication comprises providing the indication within the aircraft.

12. The method of claim 11 wherein providing the indication comprises providing the indication within a cockpit of the aircraft.

13. The method of claim 12 wherein providing the indication comprises providing at least one of an audible and visual indication.

14. The method of claim 13 wherein providing the indication comprises providing a visual display on a flight deck located within the cockpit.

15. The method of claim 1 wherein providing the indication comprises providing at least one of an audible and visual indication.

16. The method of claim 1, further comprising comparing the determined location to a predetermined location.

17. The method of claim 16 wherein the providing the indication comprises providing an indication of a discrepancy between the determined location and the predetermined location.

18. The method of claim 1, further comprising identifying a hazard in the generated image.

19. The method of claim 18, further comprising providing an alert of the identified hazard.

* * * * *